United States Patent [19]
Bauer

[11] 3,839,320
[45] Oct. 1, 1974

[54] METHOD OF PREPARING STARCH ESTERS

[75] Inventor: Clifford D. Bauer, St. Louis, Mo.

[73] Assignee: Anheuser-Busch Incorporated, St. Louis, Mo.

[22] Filed: Aug. 6, 1973

[21] Appl. No.: 385,714

[52] U.S. Cl. .................. 260/233.5, 260/233.3 R
[51] Int. Cl. .................................. C08b 19/04
[58] Field of Search.... 260/233.3 A, 233.3 R, 233.5

[56] References Cited
UNITED STATES PATENTS

| | | | |
|---|---|---|---|
| 2,935,510 | 5/1960 | Wurzburg | 260/233.3 R |
| 3,513,156 | 5/1970 | Speakman | 260/233.5 |
| 3,580,906 | 5/1971 | Bernasek et al. | 260/233.5 |
| 3,661,895 | 5/1972 | Germino et al. | 260/233.5 |

Primary Examiner—Melvyn I. Marquis
Attorney, Agent, or Firm—Gravely, Lieder & Woodruff

[57] ABSTRACT

This application covers an improved method for producing starch esters which have food and non-food uses, and particularly relates to the production of an acetylated starch useful as a thickener and texturizing ingredient in food products. Magnesium oxide or magnesium hydroxide additive is used to maintain the pH of the reaction mixture in a range favorable in the formation of starch esters. The entire amount of the alkaline additive may be added to the reaction vessel at one time to permit the controlled addition of an organic acid anhydride. This avoids loss of the anhydride and formation of excess acid as the anhydride reacts with the starch.

6 Claims, No Drawings

METHOD OF PREPARING STARCH ESTERS

BACKGROUND OF THE INVENTION

Aqueous dispersions of starches must often be used in conditions which involve storage at relatively low temperatures, or be subject to repeated freezing and thawing cycles. Starch dispersions are used in canned fruit pie fillings, as well as in a number of frozen foods, such as frozen pies, soups, and the like. Canned fruit pie fillings are often stored where no heating facilities are available and therefore, may be at very low temperatures for prolonged periods of time. In the case of frozen foods, they sometimes undergo repeated thawing and freezing cycles. Starches that are used in these circumstances of low temperature undergo a transformation. There is a distinct loss in hydrating power of the starch resulting in syneresis, together with a marked deterioration in texture and clarity.

U.S. Pat. Nos. 2,935,510, and 2,853,484 show methods of improving starches that are used in foods and subject to low temperature or freeze-thaw conditions, by treating the starch with a bridging or cross-linking polyfunctional etherification or esterification reagent and then acetylating the starch with acetic or propionic anhydride or treating the starch with other monofunctional esterification reagents.

U.S. Pat. No. 2,853,484 teaches a method of preparing cold swelling starch ethers and/or esters which, when reconstituted with water form a smooth, unctuous, transparent paste. This process involves the gelatinization of the starch in the reaction, whereas in the present invention the starch is in ungelatinized granular form throughout the process.

U.S. Pat. No. 2,935,510 involves a combination of two chemical reactions upon the starch. One reaction is the treatment of the starch with a polyfunctional etherification or esterification reagent, which results in a bridging or cross-linking of the hydroxyl groups in the starch granule. The other reaction is the acetylation of the starch with acetic or propionic anhydride. Both reactions are facilitated by alkaline conditions. It is important that the pH, both during the bridging or cross-linking and the acetylation reactions, be below the point at which the starch will gelatinize and lose its original granular, discrete structure. Starch in water will gelatinize if the degree of alkalinity or the temperature rises beyond a certain point. The particular degree of alkalinity or temperature necessary to gelatinize starch varies with the particular type of starch.

SUMMARY OF THE INVENTION

This invention comprises a process for producing starch esters from mono and dibasic organic acid anhydrides using magnesium oxide or magnesium hydroxide in the process to control the formation of excess acid.

A detailed description of my starch esterification process using magnesium oxide or magnesium hydroxide including materials, procedures and proportions follows.

DETAILED DESCRIPTION

The function of the alkali in the esterification process is to neutralize the acid which is formed after the acid anhydride is added to the starch slurry. The alkali maintains the pH limits needed for the reaction. Normally controlling the pH requires monitoring the addition of the alkali.

In the practice of this invention, I use the oxide or hydroxide of magnesium as a pH control agent in starch esterification reactions, particularly in the reaction of starch with an anhydride of a monobasic or dibasic organic acid. It maintains the pH in the desired range for the esterification reaction or acetylation reaction if the reactant is acetic anhydride. The magnesium oxide or hydroxide acts to regulate the pH without the monitoring problems associated with the use of sodium hydroxide. The magnesium oxide or hydroxide preferably is added at one time, thus neutralizing any acid initially present and also neutralizing acid formed by the reaction of starch or water with the subsequently added acid anhydride. The acid anhydride is metered into the reaction vessel after the magnesium oxide or hydroxide has been added. This avoids loss of anhydride and avoids formation of excess acid. The use of conventional alkaline catalyst (such as sodium hydroxide) in this process requires monitoring and coordinating the addition of the alkaline additive with the acetic anhydride. The conventional alkaline additives may cause a rapid localized rise in pH upon their addition to the starch slurry if insufficient amounts of acid are present to prevent the rise in pH. This can cause the starch to gelatinize and lose its granular structure.

The gelatinization of the starch makes impossible the filtration and washing of the starch product at the end of the reaction, which is necessary for food use.

The oxide or hydroxide of magnesium is of a reactive type having an Iodine Number of at least about 25 m.e.q./100 g. and is in finely divided form such that at least about 99% passes a 200 mesh screen when washed through with water.

The Iodine Number is calculated by the following method:

IODINE NUMBER DETERMINATION

Principle

The Iodine Number is one measure of activity of magnesium oxide and hydroxide and is obtained by the adsorption of iodine from a carbon tetrachloride solution under standard conditions and reported as milliequivalents of iodine per 100-g sample. A measured excess of standardized iodine in carbon tetrachloride solution is added to the sample and agitated for 30 minutes. An aliquot of the remaining solution is titrated for iodine using potassium iodide and standardized sodium thiosulfate. The amount of iodine adsorbed by the magnesium oxide or hydroxide is calculated as milliequivalents per 100 g of sample and reported as the Iodine Number.

Accuracy and Precision

The precision of the method was determined by five separate determinations of the same sample. The result and standard deviation were 35.6 ± 0.5 meq/100 g.

Apparatus and Reagents 1 100-ml. automatic burette, gravity fed from iodine solution reservoir, equipped with a drying tube on air inlet
3 Glass-stoppered Erlenmeyer flasks, 250-ml.
1 Magnetic stirrer
1 Analytical balance 0.10 N Iodine solution in anhydrous carbon tetrachloride — 12.75 g U.S.P. iodine per liter of sulphur-free carbon tetrachloride 0.05 N Sodium thiosulfate solution, standardized 0.03 N Potassium iodide solution in 75% ethanol — 4.98 g reagent-grade KI dissolved in 250 ml. deionized water and diluted by adding 750 ml. ethyl alcohol (S.D.A. 2-B, 190 proof).

Procedure

1. Rapidly weigh approximately two (2) grams of the magnesia to the nearest 0.0001 gram.
2. Transfer the sample through a powder funnel to a 250-ml. ground glass Erlenmeyer flask.
3. Rinse the automatic burette with 0.10 N iodine solution (discard the rinse). From this burette add exactly 100 ml. of 0.10 N idoine solution to the sample flask and insert the stirring bar.
4. Stopper the flask with a glass stopper and place the flask on the magnetic stirrer.
5. Agitate the sample for exactly 30 minutes.
6. Allow the sample to settle exactly 5 minutes.
7. Filter the sample through glass wool into a clean, dry 250-ml. Erlenmeyer flask.
8. Pipette 20.0 ml. of the clear supernatant solution into another 250-ml. Erlenmeyer flask containing 50 ml. of 0.03 N potassium iodide in ethanol solution.
9. Titrate with 0.05 N sodium thiosulfate solution until colorless.
10. Run a blank on 20.0 ml. 0.10 N iodine solution adding 50 ml. 0.03 N potassium iodide in ethanol and titrating with 0.05 N sodium thiosulfate until colorless.
11. Calculate Iodine Number as follows:

[Blank titr (ml) - sample titer(ml)] $\times$ N Na$_2$S$_2$O$_3$ $\times$ vol factor $\times$ 100=/sample weight I$_2$No. (meq/100 g)

In the case of a 2.000-g sample requiring 34.5 ml. with a blank of 39.5 ml. 0.05 N Na$_2$S$_2$O$_3$, this would be (39.5 − 34.5) × 0.05 × (100/20) × 100/2 = 62.5

The starch used in this process is waxy maize. Other starches suitable for this process are corn, potato, waxy sorghum, tapioca, wheat, rice, and blends of different starches, etc.

A polyfunctional agent is understood to be a substance which is capable of reacting with two or more hydroxyl groups of the starch, causing a linking or bridging of the hydroxyl groups. Such a polyfunctional cross-linking reagent would ordinarily react with the starch through an etherification or an esterification reaction. Epichlorohydrin is an example of an etherification reagent, whereas a representative example of an esterification reagent is phosphorus oxychloride.

Besides the bridging or cross-linking reaction, the edible food starch is also reacted with a monofunctional esterification reagent. This reaction, which esterifies the starch, utilizes acetic, propionic, octenylsuccinic, maleic, and succinic anhydrides. Generally, this process is suitable for controlling the pH of the reaction of any monobasic or dibasic organic anhydride. The reaction with any of these anhydrides preferably follows the bridging or cross-linking reaction, but may, of course, be accomplished independently of the cross-linking reaction or simultaneously. The order of the two reactions may be reversed, if desired.

If the starch is to be used in non-food applications such as in adhesives, it ordinarily does not have to be cross-linked with a polyfunctional etherification or esterification reagent.

In a typical procedure for practicing this invention waxy maize starch is slurried in water and held in a bath at about 70°F. to about 120°F. with continuous stirring. The slurry is made alkaline by the addition of a water soluble base as for example, sodium hydroxide or calcium hydroxide. The pH is within the approximate range of about 9.5 to about 11.5, preferably about 10.5, when the polyfunctional etherification reagent, such as epichlorohydrin, is added. If an esterification reagent is used, a pH within the approximate range of about 7.5 to about 10.5 is preferred. The amount of polyfunctional bridging or linking reagent should be within the range of about 0.05 to about 0.3 percent by weight, based on the dry weight of the starch, but preferably about 0.2 percent. This is allowed to react for approximately 2 to about 12 hours, preferably about 6 hours, when the pH is adjusted with HCl to about 5 to about 10, preferably 8.5.

The magnesium oxide or hydroxide additive may be added all at one time. The amount of the additive should be within the range of about 0.5 percent to about 3 percent based on the dry weight of the starch, but preferably is about 2 percent. The slurry is kept in the bath and is agitated while the anhydride is added at a uniform rate over a period of time. The amount of anhydride added to the starch should be about 1 percent to about 12 percent by weight, based on the dry weight of the starch, but preferably is about 8 percent. Since this too is an esterification reaction the pH should preferably be maintained within the range of about 7 to about 9. After the anhydride has been added, two volumes of the original amount of water are added and the slurry is filtered and dried. It is then ready for use.

The invention will be illustrated with reference to the following examples:

EXAMPLE NO. I

A starch slurry is formed containing 1000 parts waxy maize starch and is adjusted to a Baume' of 20.5 and held in a water bath at 105°F. with continuous stirring. To the slurry are added 3 parts of calcium hydroxide and 2-½ (2.5) parts of epichlorohydrin. After allowing to react for 6 hours the pH is adjusted to 9.0 with dilute hydrochloric acid. To the reaction mixture is added 30 parts of a reactive form of magnesium hydroxide. Stirring of the 105°F. starch slurry is continued while 120 parts of acetic anhydride are added at a uniform rate over a period of 20 minutes. At the conclusion of the acetic anhydride addition, 2 volumes of the original amount of water are added, the slurry is filtered and dried in the usual manner. The resulting starch, when pasted, was found to have a high viscosity, short texture and good clarity suitable for use in such food products as puddings, sauces, or fruit pies.

EXAMPLE NO. II

A starch slurry is formed containing 2000 parts waxy maize starch and is adjusted to a Baume' of 20.5 and held in a water bath at 105°F. with continuous stirring. To the slurry is added 6 parts of calcium hydroxide, 44 parts of magnesium oxide, and 5 parts of epichlorohydrin. At intervals of 1 hour, samples of starch slurry are taken for a Corn Industries Viscometer (CIV) viscosity (5 percent starch, dry basis). When the CIV viscosity falls to 140 × 2, 12 parts of acetic anhydride per 100 parts of remaining starch solids are added at a rate that will maintain the pH between 6.0 and 9.0, preferably at 8.0. At the conclusion of the acetic anhydride addition, 2 volumes of water are added, the slurry filtered, washed and dried in the conventional manner. The resulting starch has a high viscosity, good clarity and a short texture suitable for fruit pies, puddings, sauces and other food products.

EXAMPLE NO. III

On hundred parts of waxy maize starch is slurried in water to a Baume' of 20.5 and held in a bath at 95°F. 1.5 parts of a powdered reactive form of magnesium oxide is added and the slurry kept well stirred with a mechanical stirrer. 6 parts of acetic anhydride are slowly added at a rate controlled to maintain the pH of the reaction mixture between 8.0–9.0. At the conclusion of the acetic anhydride addition, 2 volumes of water are added (2 × the original water used) and the pH is adjusted to 5.0–5.5. The slurry is filtered and dried in the conventional manner. The resulting starch was found by analysis to have an acetyl content of 1.5 to 2.5 percent.

EXAMPLE NO. IV 100 parts of waxy maize starch are suspended in 150 parts of water. 0.45 parts of magnesium oxide and 3.0 parts of n-octenyl succinic anhydride are added to the starch slurry at 75°F. with agitation. After one hour the pH is adjusted to 5.5 with hydrochloric acid, and the slurry is filtered, washed and dried. The starch had an n-octenyl succinyl content of 2.48 percent.

EXAMPLE NO. V 500 parts waxy maize starch are suspended in 800 parts of water and the slurry maintained at a temperature of 100°–105°F. with agitation. 2.0 parts of magnesium oxide are added. 6.6 parts of succinic anhydride are added in small portions over a period of ten minutes followed by 15 minutes additional mixing. The pH of the starch slurry is adjusted to 5.5 with hydrochloric acid, and the slurry is filtered, washed and dried.

EXAMPLE NO. VI 500 parts of waxy maize starch are suspended in 800 parts of water and the slurry maintained at a temperature of 105°–120°F. with agitation. 2.5 parts of magnesium oxide are added. 8.8 parts of maleic anhydride are added over a period of 10 minutes. The pH at the conclusion of the maleic anhydride addition is 6.8. After mixing for 15 minutes the pH is 8.3. The pH of the starch slurry is adjusted to 5.5 with hydrochloric acid, and the slurry is filtered, washed and dried.

EXAMPLE VII

One hundred parts of corn starch, dry basis, is slurried in water to a Baume of 23.0 and the pH adjusted to 9.0 with 2 percent sodium hydroxide. A quantity of sodium hypochlorite, providing 2.2 to 2.4 parts of available chlorine, is added to the 80°F. slurry at a rate to maintain a pH OF 10.0 to 10.8.

The slurry temperature is maintained at 100°F. and 0.4 parts of a highly reactive form of magnesium oxide is added. With efficient mixing, 1.32 parts of succinic anhydride is added at a rate maintaining a pH of 6.8 or greater. After addition of the succinic anhydride, the pH is adjusted to 6.2 to 6.8 with hydrochloric acid and the starch filtered, washed and dried. Analysis shows a succinyl content of 1.1 percent.

EXAMPLE VIII

One hundred parts of corn starch, dry basis, is slurried in water to a Baume of 23.0 and the pH adjusted to 9.0 with 2 percent sodium hydroxide. A quantity of sodium hypochlorite, providing 2.2 to 2.4 parts of available chlorine, is added to the 80°F. slurry at a rate to maintain a pH of 10.0 to 10.8.

The slurry temperature is then maintained at 125°F. and 0.5 parts of a highly reactive form of magnesium oxide is added. With efficient mixing 1.76 parts of phthalic anhydride is added and allowed to react for 1.5 hours. The pH is adjusted to 5.5 with hydrochloric acid and the starch filtered, washed and dried. Analysis shows a phthalyl content of 1.4 percent.

What is claimed is:

1. A process for making a starch ester product which comprises reacting granular starch in slurry form with from about 1 percent to about 12 percent by weight based on dry weight of starch of an esterification reagent selected from mono or dibasic organic acid anhydride in the presence of about 0.5 percent to about 3 percent by weight based on the weight of dry starch of an alkaline additive selected from a group consisting of magnesium oxide and magnesium hydroxide in the starch slurry during the esterification reaction to control the pH in the range of about pH 5 to about pH 11.5 favorable for the reaction.

2. The method of claim 1 wherein all of the alkaline additive is added at one time.

3. The method of claim 1 wherein the starch is cross-linked.

4. The method of claim 1 which includes in the preparation of starch for food uses the steps of suspending an ungelatinized starch in water, adding to said suspension about 0.05 percent to about 0.3 percent based on the dry weight of starch of a cross-linking reagent selected from a group consisting of cross-linking polyfunctional etherification and esterification reagents to produce a cross-linked starch, adding the alkaline additive in one portion to a reaction vessel containing the said cross-linked starch to maintain the pH of the reaction mass in the range favorable for esterification and then adding an anhydride of a monobasic or dibasic organic acid.

5. The method of claim 1 wherein the anhydride reagent is selected from the group consisting of acetic, propionic, octenylsuccinic, phthalic, maleic and succinic acid anhydrides, and mixtures thereof.

6. The method of claim 1 wherein the starch is selected from a group consisting of corn, potato, waxy maize, waxy sorghum, tapioca, wheat, rice and mixtures thereof.

* * * * *